(12) United States Patent
Bhorkar et al.

(10) Patent No.: US 11,716,187 B2
(45) Date of Patent: Aug. 1, 2023

(54) METHODS FOR CQI FEEDBACK AND RRM MEASUREMENTS WITH DYNAMIC POWER SHARING AMONG MULTIPLE LAA SCELLS FOR DL-ONLY TRANSMISSION

(71) Applicant: Apple Inc., Cupertino, CA (US)

(72) Inventors: Abhijeet Bhorkar, Fremont, CA (US); Hwan-Joon Kwon, Santa Clara, CA (US); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 871 days.

(21) Appl. No.: 15/745,409

(22) PCT Filed: Apr. 1, 2016

(86) PCT No.: PCT/US2016/025677
§ 371 (c)(1),
(2) Date: Jan. 16, 2018

(87) PCT Pub. No.: WO2017/030613
PCT Pub. Date: Feb. 23, 2017

(65) Prior Publication Data
US 2018/0212740 A1 Jul. 26, 2018

Related U.S. Application Data

(60) Provisional application No. 62/205,535, filed on Aug. 14, 2015.

(51) Int. Cl.
*H04L 5/00* (2006.01)
*H04W 24/08* (2009.01)
(Continued)

(52) U.S. Cl.
CPC .......... *H04L 5/0057* (2013.01); *H04L 1/0026* (2013.01); *H04L 5/001* (2013.01);
(Continued)

(58) Field of Classification Search
None
See application file for complete search history.

(56) References Cited

U.S. PATENT DOCUMENTS 11,533,675 B2   12/2022  Chatterjee et al.
2013/0155868 A1*  6/2013  Seo ................... H03M 13/3723
                                                          370/241

(Continued)

FOREIGN PATENT DOCUMENTS

CN         102349336 A      2/2012
WO     WO 2015/081248 A1    6/2015

OTHER PUBLICATIONS

Qualcomm Inc., "Multi-carrier operation for LAA", May 29, 2015, 3GPP TSG RAN WG1 #81, pp. 1-5.*

(Continued)

*Primary Examiner* — Steve R Young
(74) *Attorney, Agent, or Firm* — Sterne, Kessler, Goldstein & Fox P.L.L.C.

(57) ABSTRACT

Described are mechanisms and methods for supporting Channel State Information (CSI) measurement and reporting, and for supporting Radio Resource Management (RRM) measurement and reporting, under License Assisted Access (LAA) with dynamic power sharing. An eNB may comprise one or more processors to generate a maximum number of Component Carriers (CCs) and a number of active CCs to a UE. The eNB may then be operable to process a reported quality rating from the UE and generate a scaled quality rating based upon the reported quality rating, the maximum number of CCs, and the number of active CCs. A UE may comprise one or more processors to process a reference signal transmission from an eNB, to generate an unfiltered reference signal transmission based upon the reference signal transmission, and to calculate a (Continued)

quality rating based upon the unfiltered reference signal transmission.

18 Claims, 11 Drawing Sheets

(51) Int. Cl.
  *H04L 1/00* (2006.01)
  *H04W 74/08* (2009.01)
  *H04B 7/06* (2006.01)
(52) U.S. Cl.
  CPC ........... *H04L 5/0048* (2013.01); *H04W 24/08* (2013.01); *H04B 7/0626* (2013.01); *H04W 74/0816* (2013.01)

(56) References Cited

U.S. PATENT DOCUMENTS

| | | | | |
|---|---|---|---|---|
| 2014/0315593 | A1* | 10/2014 | Vrzic | H04W 52/38 455/522 |
| 2015/0351115 | A1 | 12/2015 | Jeon et al. | |
| 2016/0135148 | A1* | 5/2016 | Novlan | H04L 5/0032 370/329 |
| 2017/0164301 | A1* | 6/2017 | Jeon | H04W 52/283 |
| 2017/0303220 | A1* | 10/2017 | Sadeghi | H04L 5/0048 |
| 2018/0184418 | A1* | 6/2018 | Takeda | H04W 52/18 |
| 2020/0403675 | A1* | 12/2020 | Yang | H04L 27/2613 |

OTHER PUBLICATIONS

Qualcomm Inc., "Multi-carrier operation for LAA", May 29, 2015, 3GPP TSG RAN WG1 #81, pp. 1-5 (Year: 2015).*
International Preliminary Report on Patentability for International Patent Application No. PCT/US16/25677, dated Mar. 1, 2018.
International Search Report and Written Opinion for International Patent Application No. PCT/US16/25677, dated Aug. 25, 2016.
Qualcomm, Inc., "Multi-carrier operation for LAA", 3GPP Draft; R1-152785; vol. RAN WG1; Fukuoka, Japan; May 24, 2015.
Samsung,"Discussion on CSI measurement and reporting for LAA", 3GPP Draft; R1-152868; vol. RAN WG1; Fukuoka, Japan; May 16, 2015.
Office Action directed to related Chinese Patent Application No. 2016800415350, dated Aug. 3, 2020, with attached English-language translation; 15 pages.
Communication pursuant to Article 94(3) EPC, directed to related European Patent Application No. 16718068.6, dated Jun. 7, 2021, 7 pages.
Qualcomm Incorporated, "Multi-carrier operation for LAA," 3GPP TSG RAN WG1 #82, R1-153875, Aug. 24-28, 2015, Beijing, China, 5 pages.

* cited by examiner

METHODS FOR CQI FEEDBACK AND RRM MEASUREMENTS WITH DYNAMIC POWER SHARING AMONG MULTIPLE LAA SCELLS FOR DL-ONLY TRANSMISSION

CLAIM OF PRIORITY

The present application is a National Stage Entry of, and claims priority to, PCT Application Serial Number PCT/US16/25677 filed on Apr. 1, 2016 and entitled "Methods For CQI Feedback And RRM Measurements With Dynamic Power Sharing Among Multiple LAA SCells For DL-Only Transmission," which claims priority under 35 U.S.C. 119 (e) to U.S. Provisional Patent Application Ser. No. 62/205, 535 filed Aug. 14, 2015 and entitled "Methods For CQI Feedback And RRM Measurements With Dynamic Power Sharing Among Multiple LAA SCells For DL-Only Transmission," both of which are incorporated by reference in their entireties for all purposes.

BACKGROUND

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless/5th Generation mobile networks (5G) system. Each wireless cellular communication system may support a variety of features. For example, one feature supported by LTE-A is Carrier Aggregation (CA), in which a Primary Cell (PCell) and one or more Secondary Cells (SCells) may be Component Carriers (CCs), and may aggregate their various bandwidths to provide better Downlink (DL) performance to User Equipments (UEs). For DL operation, LTE-A SCells may be based upon fixed transmission power for Downlink (DL) operation, or transmission power that may be statically maintained between occasional changes.

Meanwhile, another feature supported by various wireless cellular communications systems is the use of unlicensed bands or unlicensed spectrum under License-Assisted Access (LAA). LTE-A SCells may use unlicensed spectrum under LAA. When using unlicensed bands, however, maximum transmission power may be limited by regulatory bodies for the entire unlicensed band, independent of the number of CCs used for transmission or the transmission bandwidth used for transmission.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
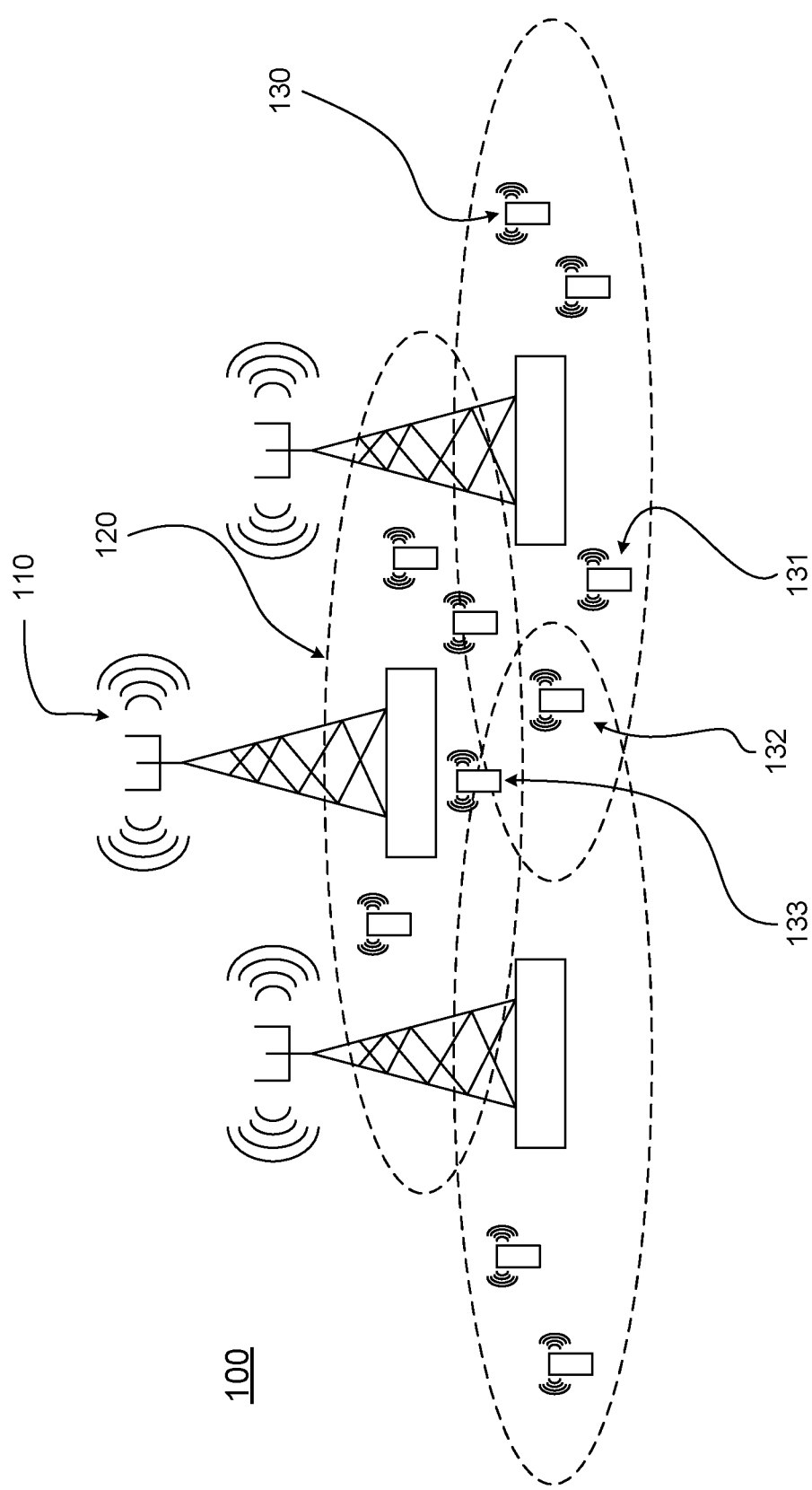
FIG. 1 illustrates a scenario of a plurality of Secondary Cells (SCells) with overlapping coverage areas, in accordance with some embodiments of the disclosure.

Some wireless cellular communication systems may support Carrier Aggregation (CA) in which a Primary Cell (PCell) interoperates with one or more Secondary Cells (SCells), each acting as a Component Carrier (CC) contributing to an aggregated Downlink (DL) bandwidth to various User Equipments (UEs). In licensed spectrum, SCells may operate under fixed or semi-static transmission power per SCell.

Meanwhile, when using unlicensed bands, maximum transmission power for an entire unlicensed band may be regulated. Moreover, the maximum transmission power may vary between different bandwidths or portions of spectrum. As an initial example, in indoor operation, a maximum transmission power may be limited to 23 dBm for operation in the 5150 MHz to 5250 MHz band or the 5250 MHz to 5350 MHz band, regardless of the number of CCs in use or the bandwidth being used by CCs.

As a further example, in WiFi operation, a transmission power on each carrier for each transmission may be dynamically modified based upon a number of channels used for channel bonding by equally sharing the transmission power across the number of channels used. Under various transmission constraints for operation in the 5150 MHz to 5250 MHz band or the 5250 MHz to 5350 MHz band, for 20 MHz transmission, up to 23 dBm transmission power may be used; for 40 MHz transmission, each channel may use a transmission power of up to 20 dBm; and for 80 MHz transmission, each channel may use a transmission power of up to 17 dBm.

SCells operating in unlicensed spectrum or unlicensed bands, such as SCells operating under License-Assisted Access (LAA), may also be constrained to not exceed a total per-channel power budget. These power constraints may apply regardless of the number of CCs aggregating in that channel or the bandwidth those CCs support. In order to operate within regulatory constraints upon power usage, SCells operating under LAA in situations in which multiple CCs may be used for DL burst transmissions may accordingly be disposed to dynamically sharing power.

However, channel quality may be indicated not merely by a signal's power as measured by a receiver, but by a difference between the signal's power when transmitted and the signal's power when received. As a result, under conditions in which transmission power is dynamic, more meaningful Channel Quality Indication (CQI) measurements and Radio Resource Management (RMM) measurements may depend upon a power used in transmitting various signals being measured. Various mechanisms and methods for facilitating better link-quality measurements for SCells engaging in dynamic power sharing are discussed below.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/− 10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1 illustrates a scenario of a plurality of Secondary Cells (SCells) with overlapping coverage areas, in accordance with some embodiments of the disclosure. A wireless cellular communications scenario 100 includes a plurality of Evolved Node-Bs (eNBs) 110. Each eNB 110 may provide wireless cellular communications services within a cell 120 extending over a geographic area. Some cells 120 may extend into geographic areas that overlap geographic areas into which other cells 120 extend.

In scenario 100, a plurality of User Equipments (UEs) 130 may interact with eNBs 110 to make use of the cellular services. eNBs 110 may be base stations operable within one or more of: a 3rd Generation Partnership Project (3GPP) Universal Mobile Telecommunications System (UMTS) system; a 3GPP Long-Term Evolution (LTE) system; a 3GPP LTE-Advanced (LTE-A) system; and a 5th Generation wireless/5th Generation mobile networks (5G) system. Similarly, UEs 130 may accordingly be operable within one or more of a UMTS system, an LTE system, an LTE-A system, and a 5G system.

Based upon the partially overlapping nature of cells 120, some UEs 131 may be situated in geographic areas within a cell 120 served by a single eNB 110. Other UEs 132 may be situated in geographic areas within two cells 120 served by two eNBs 110, while still other UEs 133 may be situated in geographic areas within three cells 120 served by three eNBs 110.

eNBs 110 may comprise SCells in a CA scenario, and may be CCs interoperating with a PCell to contribute to an aggregated DL bandwidth for various UEs. In addition, eNBs 110 may at least partially operate in unlicensed spectrum or unlicensed bands. Accordingly, eNBs 110 may engage in dynamic power sharing among each other in order to operate under regulatory power limits, and may benefit from mechanisms and methods for facilitating more meaningful link-quality measurements. Meanwhile, maximum transmission power may vary between different bandwidths or portions of spectrum.

A. CSI Measurement and Reporting

Dynamic power sharing among multiple SCells may impact Channel State Information (CSI) reporting and link adaptation at an eNB. For example, an eNB 110 may transmit various Cell-specific Reference Signals (CRS) and/ or CSI Reference Signals (CSI-RS) used for CSI measurements, and a UE 130 may then receive the CRS and/or CSI-RS signals and use them for CSI measurements.

Due to dynamic power sharing, eNB 110 may transmit the signals under conditions of varying transmission power, and UE 130 may measure the signals as having varying power. However, the varying power of the signals received at UE 130 may merely reflect the varying power used to transmit the signals, and may not reflect a variance in the link quality. As a result, such variances in received power may potentially cause inconsistencies in reported CSI feedback.

These potential inconsistencies in reported CSI feedback may be corrected either at an eNB or at a UE. For correction at an eNB, in some embodiments, eNB 110 may have information before-hand regarding a transmission power used for a CRS transmission or a CSI-RS transmission that UE 130 subsequently uses for purposes of CQI feedback. Accordingly, eNB 110 may scale a reported CSI received from UE 130, based upon a transmission power for the transmission. For example, an unscaled transmission power (such as a transmission power in the absence of dynamic power sharing) may be $X_1$, a transmission power causing the reported CSI may be $X_2$, and a reported CSI may be $Y_2$. In such cases, a scaled reported CSI $Y_1$ may be substantially equal to $Y_2$ divided by $X_2$ and multiplied by $X_1$.

In such embodiments, UE 130 may refrain from applying any filtering for computing CSI feedback, and may instead compute CSI feedback based upon an unfiltered signal. When computing CSI feedback based upon an unfiltered signal, UE 130 may not compute the CSI feedback across multiple subframes, and/or may not compute the CSI feedback for multiple references signals. Instead, UE 130 may compute the CSI feedback across one subframe, and/or for one reference signal.

For some embodiments of correction at a UE, a number of CCs being used for DL transmission may be explicitly signaled to UE 130. For some such embodiments, an eNB 110 acting as a PCell may indicate to UE 130 a number of CCs used for ongoing transmissions on an unlicensed band. Downlink Control Information (DCI) from a licensed carrier (e.g., the eNB 110 acting as a PCell) may indicate a number of CCs used for a previous sub-frame, or a number of CCs used for an ongoing burst on an unlicensed carrier. In such embodiments, DCI may explicitly indicate one or more of the following:

a scaling factor indicating a ratio of actual transmission power to maximum transmission power for a CRS transmission;
a list of active SCells (such as SCells participating in an ongoing transmission or an ongoing burst); and
a transmission power used for a CRS transmission and/or a CSI-RS transmission, for each CC, where unequal power transmission among the CCs is used.

The list of active SCells or CCs participating in an ongoing transmission or an ongoing burst, and/or a number of active SCells or CCs participating in an ongoing transmission or an ongoing burst, may be determined at a predetermined time before the transmission of a reference signal, or within a predetermined window of time before the transmission of the reference signal, or at substantially the same time as the transmission of the reference signal.

The transmission power indicated by DCI may be a transmission power for each CC, or an average transmission power over the CCs. For other embodiments of correction at a UE, eNB 110 acting as an SCell may explicitly indicate a transmission power to UE 130 by transmitting an initial signal before transmission of a DL burst on one or more active SCells, up to and including all active SCells. The initial signal may indicate one or more of the following:

a scaling factor indicating a ratio of actual transmission power to maximum transmission power for a CRS transmission;
a list of SCells used for a data burst transmission; and
a transmission power for each CC.

In some embodiments, one SCell may indicate information to a UE on behalf of other SCells. In such embodiments, UE 130 may determine a number of SCells used for a current data burst or subframe on an unlicensed band by a presence of Physical Downlink Control Channel (PDCCH) on configured CCs.

The list of SCells used for a data burst transmission, and/or a number of SCells used for a data burst transmission, may be determined at a predetermined time before the transmission of a reference signal, within a predetermined window of time before the transmission of a reference signal, or at substantially the same time as the transmission of the reference signal.

An SCell may have information regarding a maximum transmission power for a bandwidth or portion of spectrum in which various configured CCs may operate, and/or a maximum number of CCs that may operate within the bandwidth or portion of spectrum based upon the maximum transmission power. Since the maximum transmission power may vary between different bandwidths or portions of spectrum, the number of CCs that may operate within a bandwidth or portion of spectrum may vary between different bandwidths or portions of spectrum.

Common search space may also be modified to be enabled for LAA SCells. In addition, to reduce UE complexity, an aggregation level may be fixed, or possible aggregation levels may be reduced. The particular SCells that a UE may monitor in common search space may also be limited, in a UE-specific manner.

B. RRM Measurement and Reporting

Under LAA, RRM measurements may be performed based upon a single Demodulation Reference Signal (DRS) occasion. Due to dynamic power sharing, eNB 110 may transmit DRS signals under conditions in which transmission power may vary across DRS occasions, and UE 130 may measure the DRS signals as having varying power across DRS occasions. However, the varying power of the DRS signals received at UE 130 may merely reflect the varying power used to transmit the signals, and may not reflect a variance in link quality across the DRS occasions. As a result, the variance in received power may potentially cause UE 130 to generate inconsistent RRM reports.

These potential inconsistencies in reported RRM may be corrected in various ways. In a first set of embodiments, DRS transmission power may be maintained or fixed at a constant level that may be independent of a number of CCs used at the time of DRS transmission. The DRS transmission power may accordingly be fixed to be within regulations, and may be invariant with respect to a number of active LAA CCs. In such embodiments, a variance across DRS occasions of the power of DRS signals received at UE 130 may reflect a variance in link quality across DRS occasions.

In a second set of embodiments, DRS transmission power may vary across DRS occasions depending upon a number of available channels. Since Layer 3 (L3) filtering of measured values may resemble averaging across multiple subframes, RRM reports may not be accurate when L3 filtering is applied. Accordingly, in such embodiments, L3 filtering might not be applied for RRM measurements.

For some of the second set of embodiments, an SCell may explicitly indicate a DRS transmission power for each DRS occasion through Layer 1 (L1) signaling. The signal may be transmitted using a Physical Downlink Control Channel (PDCCH), an Enhanced PDCCH (EPDDCH), or a new control channel. Since L1 signaling may provide an actual DRS transmission power from an eNB to a UE, one or more SCells in a group of aggregated CCs may independently indicate a DRS transmission power to the same UE. The UE may then determine a correct power for an RRM report, based on the indicated DRS transmission power.

Alternatively, an SCell may indicate a number of CCs used for DRS transmission, in which case the UE may determine a corrected power for an RRM report based upon a splitting of DRS transmission power among the various CCs serving the UE.

For others of the second set of embodiments, an SCell might not explicitly indicate a DRS transmission power through L1 signaling. Instead, a UE may measure RRM based upon a single DRS occasion, as a design target of LAA.

In some such embodiments, DRS and/or RRM measurement reports may be transmitted periodically, and there may be a timing relationship between a DRS subframe and an RRM report. An eNB receiving an RRM measurement report may then determine a corrected transmission power based upon information the eNB possesses regarding the transmission power used for the DRS transmission used by the UE for preparing the RRM measurement report. In other such embodiments, event-driven RRM measurements may be based upon DRS transmissions from single DRS occasions.

In a third set of embodiments, DRS occasions for different CCs may be separated in time, which may enable full DRS transmission power. RRM measurements may then be based on standalone DRS transmission.

C. Example Wireless Cellular Communications System Devices

Figure 2:
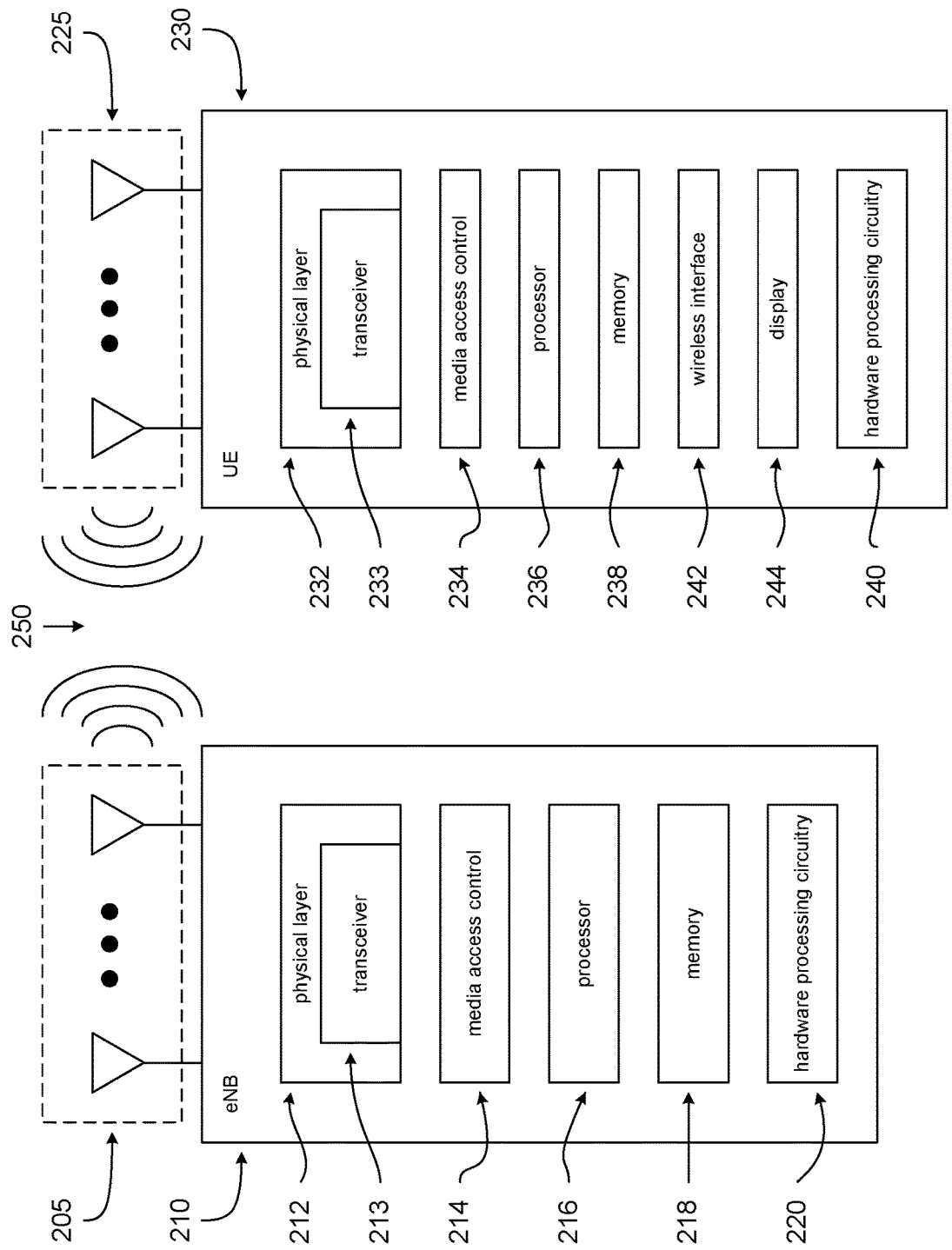
FIG. 2 illustrates an Evolved Node B (eNB) and a User Equipment (UE), in accordance with some embodiments of the disclosure.

FIG. 2 illustrates an Evolved Node B (eNB) and a User Equipment (UE), in accordance with some embodiments of the disclosure of the disclosure. FIG. 2 includes block diagrams of an eNB 210 and a UE 230 which are operable to co-exist with each other and other elements of an LTE network. High-level, simplified architectures of eNB 210 and UE 230 are described so as not to obscure the embodiments. It should be noted that in some embodiments, eNB 210 may be a stationary non-mobile device.

eNB 210 is coupled to one or more antennas 205, and UE 230 is similarly coupled to one or more antennas 225. However, in some embodiments, eNB 210 may incorporate or comprise antennas 205, and UE 230 in various embodiments may incorporate or comprise antennas 225.

In some embodiments, antennas 205 and/or antennas 225 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 205 are separated to take advantage of spatial diversity.

eNB 210 and UE 230 are operable to communicate with each other on a network, such as a wireless network. eNB 210 and UE 230 may be in communication with each other over a wireless communication channel 250, which has both a downlink path from eNB 210 to UE 230 and an uplink path from UE 230 to eNB 210.

As illustrated in FIG. 2, in some embodiments, eNB 210 may include a physical layer circuitry 212, a MAC (media access control) circuitry 214, a processor 216, a memory 218, and a hardware processing circuitry 220. A person skilled in the art will appreciate that other components not shown may be used in addition to the components shown to form a complete eNB.

In some embodiments, physical layer circuitry 212 includes a transceiver 213 for providing signals to and from UE 230. Transceiver 213 provides signals to and from UEs or other devices using one or more antennas 205. In some embodiments, MAC circuitry 214 controls access to the wireless medium. Memory 218 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 220 may comprise logic devices or circuitry to perform various operations. In some embodiments, processor 216 and memory 218 are arranged to perform the operations of hardware processing circuitry 220, such as operations described herein with reference to logic devices and circuitry within eNB 210 and/or hardware processing circuitry 220.

As is also illustrated in FIG. 2, in some embodiments, UE 230 may include a physical layer circuitry 232, a MAC circuitry 234, a processor 236, a memory 238, a hardware processing circuitry 240, a wireless interface 242, and a display 244. A person skilled in the art would appreciate that other components not shown may be used in addition to the components shown to form a complete UE.

In some embodiments, physical layer circuitry 232 includes a transceiver 233 for providing signals to and from eNB 210 (as well as other eNBs). Transceiver 233 provides signals to and from eNBs or other devices using one or more antennas 225. In some embodiments, MAC circuitry 234 controls access to the wireless medium. Memory 238 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 242 may be arranged to allow the processor to communicate with another device. Display 244 may provide a visual and/or tactile display for a user to interact with UE 230, such as a touch-screen display. Hardware processing circuitry 240 may comprise logic devices or circuitry to perform various operations. In some embodiments, processor 236 and memory 238 may be arranged to perform the operations of hardware processing circuitry 240, such as operations described herein with reference to logic devices and circuitry within UE 230 and/or hardware processing circuitry 240.

Elements of FIG. 2, and elements of other figures discussed below having the same names or reference numbers, can operate or function in the manner described herein with respect to any such figures (although the operation and function of such elements is not limited to such descriptions). For example, FIGS. 3-5, 8-9, and 11 also depict embodiments of eNBs, hardware processing circuitry of eNBs, UEs, and/or hardware processing circuitry of UEs, and the embodiments described with respect to FIG. 2 and FIGS. 3-5, 8-9, and 11 can operate or function in the manner described herein with respect to any of the figures.

In addition, although eNB 210 and UE 230 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 6:
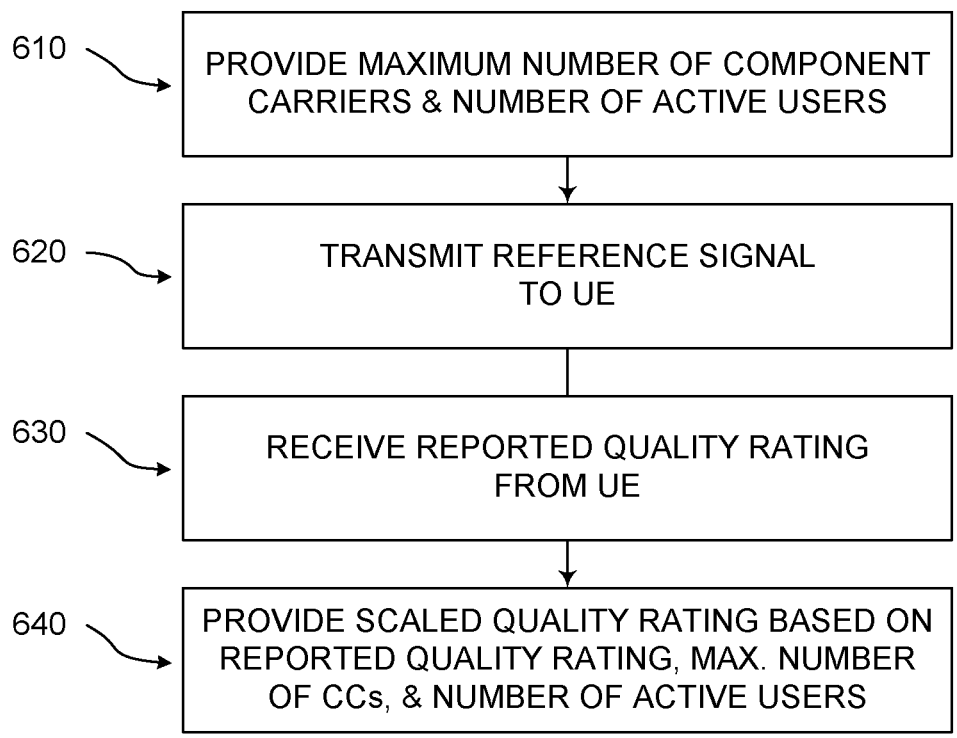
FIG. 6 illustrates methods for an eNB for supporting CSI measurement and reporting under LAA with dynamic power sharing, in accordance with some embodiments of the disclosure.
Figure 7:
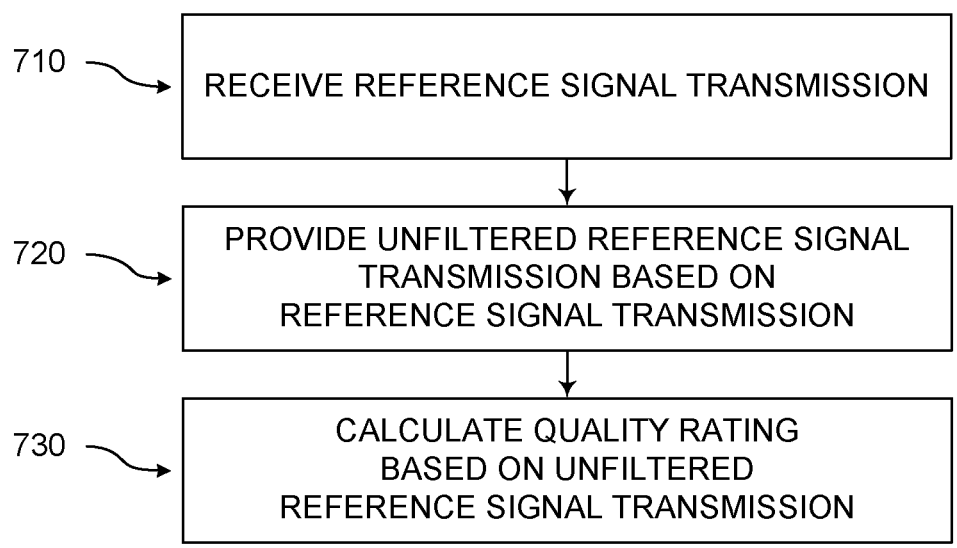
FIG. 7 illustrates methods for a UE for supporting CSI measurement and reporting under LAA with dynamic power sharing, in accordance with some embodiments of the disclosure.
Figure 10:
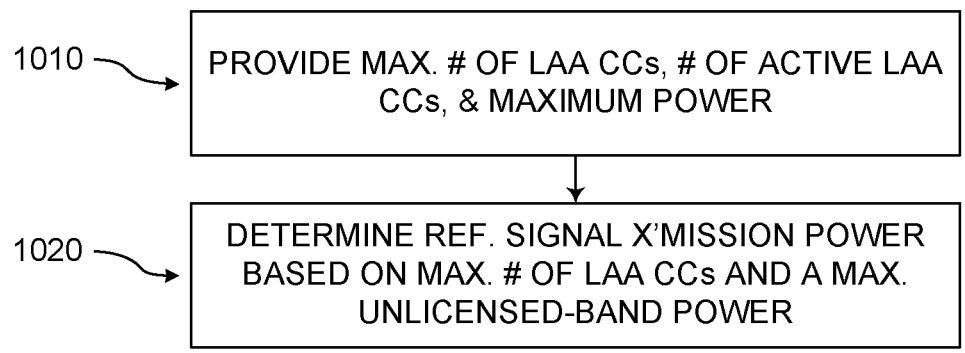
FIG. 10 illustrates methods for an eNB for supporting RRM measurement and reporting under LAA with dynamic power sharing, in accordance with some embodiments of the disclosure.

Various methods that may relate to eNB 210, hardware processing circuitry 220, UE 230, and hardware processing circuitry 240 are discussed below. Although the actions in the flowcharts with reference to FIGS. 6-7 and 10 are shown in a particular order, the order of the actions can be modified. Thus, the illustrated embodiments can be performed in a different order, and some actions may be performed in parallel. Some of the actions and/or operations listed in FIGS. 6-7 and 10 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 210 and/or hardware processing circuitry 220 to perform an operation comprising any of the methods of FIGS. 6 and 10. Similarly, in some embodiments, machine readable storage media may have executable instructions that, when executed, cause UE 230 and/or hardware processing circuitry 240 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 3:
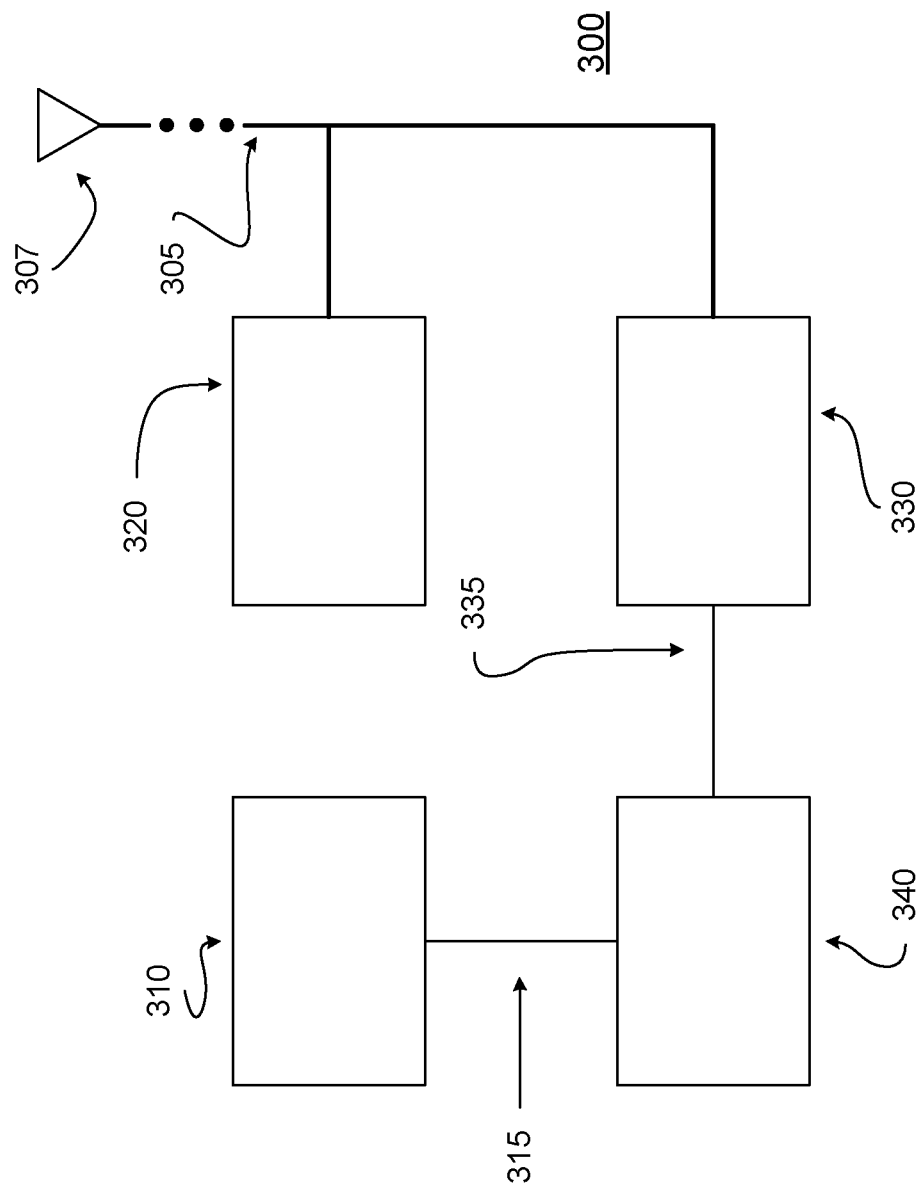
FIG. 3 illustrates hardware processing circuitries for an eNB for supporting Channel State Information (CSI) measurement and reporting under License Assisted Access (LAA) with dynamic power sharing, in accordance with some embodiments of the disclosure.

D. Example Hardware Processing Circuitries and Methods—Supporting CSI Measurement and Reporting Under LAA with Dynamic Power Sharing FIG. 3 illustrates hardware processing circuitries for an eNB for supporting Channel State Information (CSI) measurement and reporting under License Assisted Access (LAA) with dynamic power sharing, in accordance with some embodiments of the disclosure. A hardware processing circuitry 300 may comprise logic devices and/or circuitry operable to perform various operations. For example, with reference to FIGS. 2 and 3, eNB 210 (or various elements or components therein, such as hardware processing circuitry 220, or combinations of elements or components therein) may include part of, or all of, hardware processing circuitry 300. In some embodiments, processor 216 and memory 218 (and/or other elements or components of eNB 210) may be arranged to perform the operations of hardware processing circuitry 300, such as operations described herein with reference to devices and circuitry within hardware processing circuitry 300. For example, one or more devices or circuits of hardware processing circuitry 300 may be implemented by combinations of software-configured elements and/or other hardware elements.

In some embodiments, hardware processing circuitry 300 may comprise one or more antenna ports 305 operable to provide various transmissions over a wireless communication channel (such as wireless communication channel 250). Antenna ports 305 may be coupled to one or more antennas 307 (which may be antennas 205). In some embodiments, hardware processing circuitry 300 may incorporate antennas 307, while in other embodiments, hardware processing circuitry 300 may merely be coupled to antennas 307.

Antenna ports 305 and antennas 307 may be operable to provide signals from an eNB to a wireless communications channel and/or a UE, and may be operable to provide signals from a UE and/or a wireless communications channel to an eNB. For example, antenna ports 305 and antennas 307 may be operable to provide transmissions from eNB 210 to wireless communication channel 250 (and from there to UE 230, or to another UE). Similarly, antennas 307 and antenna ports 305 may be operable to provide transmissions from a wireless communication channel 250 (and beyond that, from UE 230, or another UE) to eNB 210.

An apparatus of eNB 210 (or another eNB or base station) may be operable to communicate with UE 230 (or another UE or mobile equipment) on a wireless network, and may comprise hardware processing circuitry 300. In some embodiments, the eNB (or other base station) may be a device comprising an application processor, a memory, one or more antenna ports, and an interface for allowing the application processor to communicate with another device.

With reference to FIG. 3, hardware processing circuitry 300 may comprise a first circuitry 310, a second circuitry 320, a third circuitry 330, and a fourth circuitry 340. First circuitry 310 may be operable to provide a maximum number of CCs and a number of active CCs over an interface 315. In some embodiments, the maximum number of CCs may include a Primary Cell PCell and one or more SCells. In various embodiments, the number of active CCs may be determined, for some embodiments, at substantially the same time as the transmission of the reference signal.

Second circuitry 320 may be operable to transmit a reference signal to UE 230. In various embodiments, the reference transmission may be either a CRS transmission or a CSI-RS transmission.

Third circuitry 330 may be operable to receive a reported quality rating from UE 230. In some embodiments, the reported quality rating may be part of a CQI transmission based on the reference signal transmitted by the eNB. Third circuitry 330 may be operable to provide the reported quality rating to fourth circuitry 340 over an interface 335.

Fourth circuitry 340 may be operable to provide a scaled quality rating based upon the reported quality rating, the maximum number of CCs, and the number of active CCs. In some embodiments, the scaled quality rating may be determined based upon the reported quality rating divided by a ratio of the number of active CCs to the maximum number of CCs. In some embodiments, the scaled quality rating may be determined based upon the reported quality rating divided by a ratio of a transmission power resulting in the reported quality rating to a maximum transmission power.

In some embodiments, first circuitry 310, second circuitry 320, third circuitry 330, and fourth circuitry 340 may be implemented as separate circuitries. In other embodiments, one or more of first circuitry 310, second circuitry 320, third circuitry 330, and fourth circuitry 340 may be combined and implemented together in a circuitry without altering the essence of the embodiments. In various embodiments, processor 216 (and/or one or more other processors which eNB 210 may comprise) may be arranged to perform the operations of first circuitry 310, second circuitry 320, third circuitry 330, and/or fourth circuitry 340. In such embodiments, first circuitry 310, second circuitry 320, third circuitry 330, and/or fourth circuitry 340 may accordingly be implemented by various combinations of software-configured elements (e.g., processor 216, and/or one or more other processors) and/or other hardware elements. In various embodiments, processor 216 (and/or one or more other processors which eNB 210 may comprise) may be a baseband processor.

Figure 4:
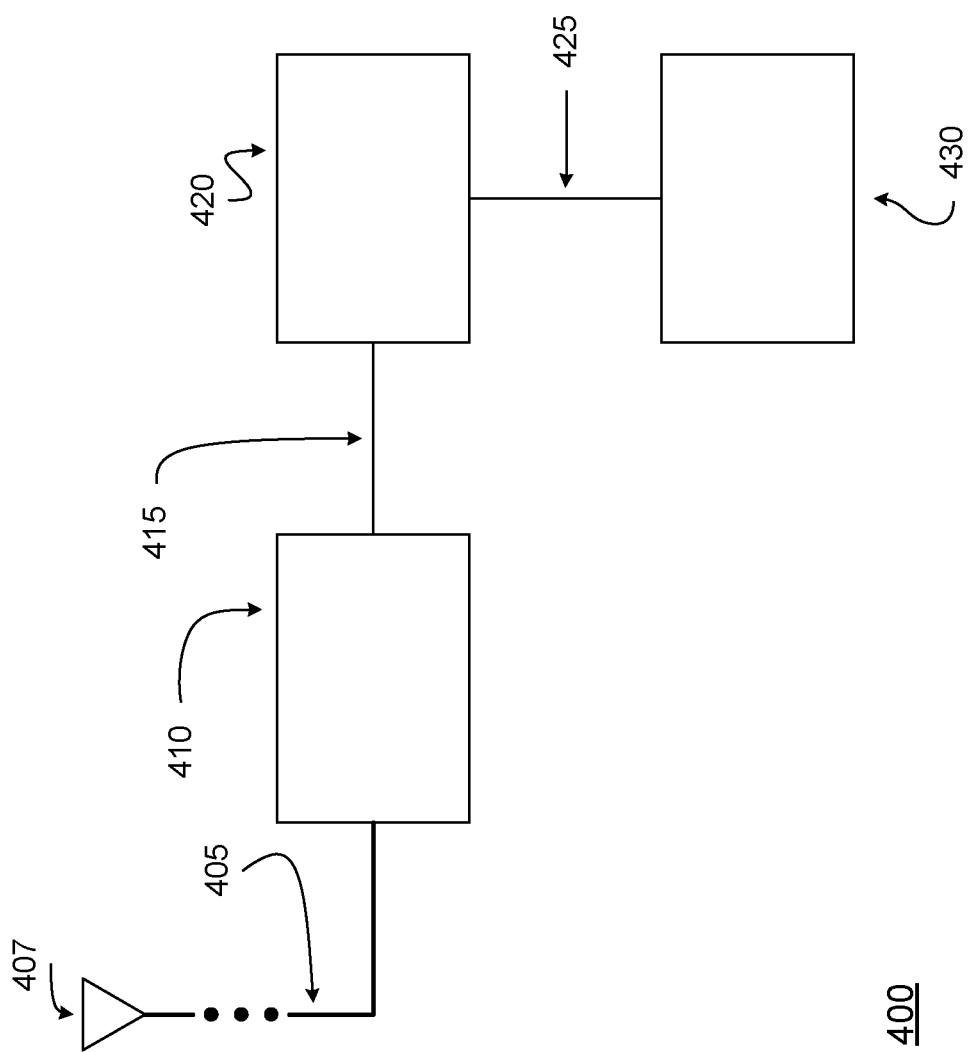
FIGS. 4-5 illustrate hardware processing circuitries for a UE for supporting CSI measurement and reporting under LAA with dynamic power sharing, in accordance with some embodiments of the disclosure.
Figure 5:
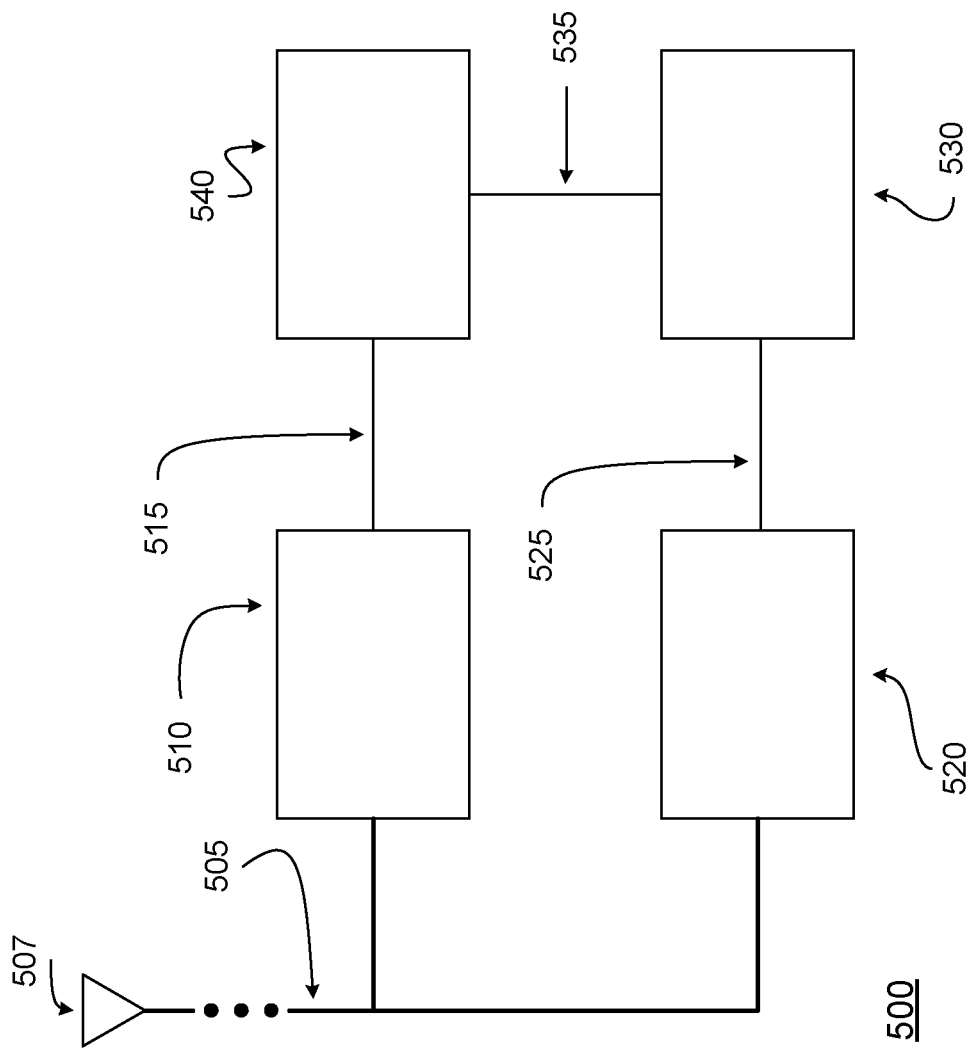

FIGS. 4-5 illustrate hardware processing circuitries for a UE for supporting CSI measurement and reporting under LAA with dynamic power sharing, in accordance with some embodiments of the disclosure. In FIG. 4, a hardware processing circuitry 400 may comprise logic devices and/or circuitry operable to perform various operations. For example, with reference to FIGS. 2 and 4, UE 230 (or various elements or components therein, such as hardware processing circuitry 240, or combinations of elements or components therein) may include part of, or all of, hardware processing circuitry 400. In some embodiments, processor 236 and memory 238 (and/or other elements or components of UE 230) may be arranged to perform various operations of hardware processing circuitry 400, such as operations described herein with reference to devices and circuitry within hardware processing circuitry 400. For example, one or more devices or circuits of hardware processing circuitry 400 may be implemented by combinations of software-configured elements and/or other hardware elements.

In some embodiments, hardware processing circuitry 400 may comprise one or more antenna ports 405 operable to provide various transmissions over a wireless communication channel (such as wireless communication channel 250). Antenna ports 405 may be coupled to one or more antennas 407 (which may be antennas 205). In some embodiments, hardware processing circuitry 400 may incorporate antennas 407, while in other embodiments, hardware processing circuitry 400 may merely be coupled to antennas 407.

Antenna ports 405 and antennas 407 may be operable to provide signals from a UE to a wireless communications channel and/or an eNB, and may be operable to provide signals from an eNB and/or a wireless communications channel to a UE. For example, antenna ports 405 and antennas 407 may be operable to provide transmissions from UE 230 to wireless communication channel 250 (and from there to eNB 210, or to another eNB). Similarly, antennas 407 and antenna ports 405 may be operable to provide transmissions from a wireless communication channel 250 (and beyond that, from eNB 210, or another eNB) to UE 230.

An apparatus of UE 230 (or another UE or mobile handset) may be operable to communicate with an eNB on a wireless network, and may comprise hardware processing circuitry 400. In some embodiments, the UE (or other mobile handset) may be a device comprising an application processor, a memory, one or more antennas, a wireless interface for allowing the application processor to communicate with another device, and a touch-screen display.

With reference to FIG. 4, hardware processing circuitry 400 may comprise a first circuitry 410, a second circuitry 420, and a third circuitry 430. First circuitry 410 may be operable to receive a reference signal transmission from eNB 210. For various embodiments, the reference signal transmission may be either a CRS transmission or a CSI-RS transmission. First circuitry may provide the reference signal transmission to second circuitry 420 over an interface 415.

Second circuitry 420 may be operable to provide an unfiltered reference signal transmission based on the reference signal transmission. The unfiltered reference signal transmission may be provided to third circuitry 430 over an interface 425.

Third circuitry 430 may be operable to calculate a quality rating based upon the unfiltered reference signal transmission. In some embodiments, the quality reporting may be included in a CQI transmission.

In some embodiments, first circuitry 410, second circuitry 420, and third circuitry 430 may be implemented as separate circuitries. In other embodiments, one or more of first circuitry 410, second circuitry 420, and third circuitry 430 may be combined and implemented together in a circuitry without altering the essence of the embodiments. In various embodiments, processor 236 (and/or one or more other processors which UE 230 may comprise) may be arranged to perform the operations of first circuitry 410, second circuitry 420, and/or third circuitry 430. In such embodiments, first circuitry 410, second circuitry 420, and/or third circuitry 430 may accordingly be implemented by various combinations of software-configured elements (e.g., processor 236, and/or one or more other processors) and/or other hardware elements. In various embodiments, processor 236 (and/or one or more other processors which UE 230 may comprise) may be a baseband processor.

In FIG. 5, a hardware processing circuitry 500 may comprise logic devices and/or circuitry operable to perform various operations. For example, with reference to FIGS. 2 and 5, UE 230 (or various elements or components therein, such as hardware processing circuitry 240, or combinations of elements or components therein) may include part of, or all of, hardware processing circuitry 500. In some embodiments, processor 236 and memory 238 (and/or other elements or components of UE 230) may be arranged to perform various operations of hardware processing circuitry 500, such as operations described herein with reference to devices and circuitry within hardware processing circuitry 500. For example, one or more devices or circuits of hardware processing circuitry 500 may be implemented by combinations of software-configured elements and/or other hardware elements.

In some embodiments, hardware processing circuitry 500 may comprise one or more antenna ports 505 operable to provide various transmissions over a wireless communication channel (such as wireless communication channel 250). Antenna ports 505 may be coupled to one or more antennas 507 (which may be antennas 205). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from a UE to a wireless communications channel and/or an eNB, and may be operable to provide signals from an eNB and/or a wireless communications channel to a UE. For example, antenna ports 505 and antennas 507 may be operable to provide transmissions from UE 230 to wireless communication channel 250 (and from there to eNB 210, or to another eNB). Similarly, antennas 507 and antenna ports 505 may be operable to provide transmissions from a wireless communication channel 250 (and beyond that, from eNB 210, or another eNB) to UE 230.

An apparatus of UE 230 (or another UE or mobile handset) may be operable to communicate with an eNB on a wireless network, and may comprise hardware processing circuitry 500. In some embodiments, the UE (or other mobile handset) may be a device comprising an application processor, a memory, one or more antennas, a wireless interface for allowing the application processor to communicate with another device, and a touch-screen display.

With reference to FIG. 5, hardware processing circuitry 500 may comprise a first circuitry 510, a second circuitry 520, a third circuitry 530, and a fourth circuitry 540. First circuitry 510 may be operable to receive a DCI transmission from eNB 210. In various embodiments, the DCI transmission may indicate a number of CCs used for either a previous sub-frame, or an ongoing burst transmitted by eNB 210 on an unlicensed CC.

Second circuitry 520 may be operable to receive a reference signal transmission from eNB 210, which second circuitry 520 may then provide third circuitry 530 over an interface 525. Third circuitry 530 may be operable to determine a raw quality rating based upon a measurement of the reference signal transmission.

For some embodiments, the DCI transmission may indicate a transmission power. In various embodiments, the DCI transmission may include at least one of: a scaling factor, a list of active SCells, a list of SCells used for data burst transmission, and a transmission power for one or more CCs.

In some embodiments, eNB 210 may include a PCell, and in some embodiments, eNB 210 may include a SCell.

First circuitry 510 may provide the DCI transmission to fourth circuitry 540 on an interface 515, and third circuitry may provide the raw quality rating to fourth circuitry 540 on an interface 535. Fourth circuitry 540 may then be operable to calculate a scaled quality rating based upon the raw quality rating and scaling information included in the DCI. For example, in some embodiments, the scaled quality rating may be determined by multiplying or dividing the raw quality rating by a scaling factor included in the scaling information.

In some embodiments, the fourth circuitry may be operable to determine a number of SCells used either for a subframe, or for a data burst on an unlicensed band, based upon presence of PDCCH transmissions on one or more CCs.

In some embodiments, first circuitry 510, second circuitry 520, third circuitry 530, and fourth circuitry 540 may be implemented as separate circuitries. In other embodiments, one or more of first circuitry 510, second circuitry 520, third circuitry 530, and fourth circuitry 540 may be combined and implemented together in a circuitry without altering the essence of the embodiments. In various embodiments, processor 236 (and/or one or more other processors which UE 230 may comprise) may be arranged to perform the operations of first circuitry 510, second circuitry 520, third circuitry 530, and/or fourth circuitry 540. In such embodiments, first circuitry 510, second circuitry 520, third circuitry 530, and/or fourth circuitry 540 may accordingly be implemented by various combinations of software-configured elements (e.g., processor 236, and/or one or more other processors) and/or other hardware elements. In various embodiments, processor 236 (and/or one or more other processors which UE 230 may comprise) may be a baseband processor.

FIG. 6 illustrates methods for an eNB for supporting CSI measurement and reporting under LAA with dynamic power sharing, in accordance with some embodiments of the disclosure. A method 600 may comprise a providing 610, a transmitting 620, a receiving 630, and a providing 640. In providing 610, a maximum number of CCs and a number of active CCs may be provided for eNB 210 (or another eNB). In transmitting 620, a reference signal may be transmitted to a UE 230 (or another UE). In receiving 630, a reported quality rating from UE 230 may be received. In providing 640, a scaled quality rating based upon the reported quality rating, the maximum number of CCs, and the number of active CCs may be provided.

In some embodiments of method 600, the maximum number of CCs may include a PCell and one or more SCells. In various embodiments, the scaled quality rating may be determined based upon the reported quality rating divided by a ratio of the number of active CCs to the maximum number of CCs. In some embodiments, the scaled quality rating may be determined based upon the reported quality rating divided by a ratio of a transmission power resulting in the reported quality rating to a maximum transmission power.

For some embodiments of method 600, the reported quality rating may be received as part of a CQI transmission based on the reference signal transmitted by eNB 210. For some embodiments, the reference transmission may be selected from a group consisting of a CRS transmission and a CSI-RS transmission. In some embodiments, the number of active CCs may be determined at substantially the same time as the transmission of the reference signal.

FIG. 7 illustrates methods for a UE for supporting CSI measurement and reporting under LAA with dynamic power sharing, in accordance with some embodiments of the disclosure. A method 700 may comprise a receiving 710, a providing 720, and a calculating 730. In receiving 710, a reference signal transmission from eNB 210 (or another eNB) may be received by UE 230 (or another UE). In providing 720, an unfiltered reference signal transmission based on the reference signal transmission may be provided. In calculating 730, a quality rating based upon the unfiltered reference signal transmission may be calculated.

In some embodiments of method 700, the reference signal transmission may be either a CRS transmission or a CSI-RS transmission. In various embodiments, the quality reporting is included in a CQI transmission.

Figure 8:
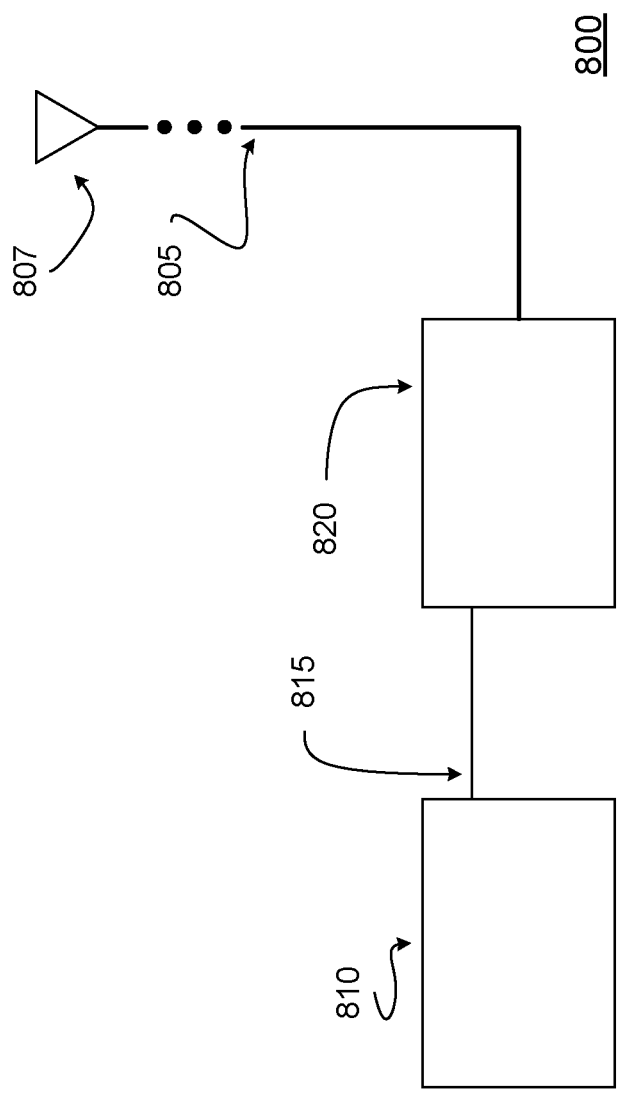
FIG. 8 illustrates hardware processing circuitries for an eNB for supporting Radio Resource Management (RRM) measurement and reporting under LAA with dynamic power sharing, in accordance with some embodiments of the disclosure.

E. Example Hardware Processing Circuitries and Methods—Supporting RRM Measurement and Reporting Under LAA With Dynamic Power Sharing FIG. 8 illustrates hardware processing circuitries for an eNB for supporting Radio Resource Management (RRM) measurement and reporting under LAA with dynamic power sharing, in accordance with some embodiments of the disclosure. A hardware processing circuitry 800 may comprise logic devices and/or circuitry operable to perform various operations. For example, with reference to FIGS. 2 and 8, eNB 210 (or various elements or components therein, such as hardware processing circuitry 220, or combinations of elements or components therein) may include part of, or all of, hardware processing circuitry 800. In some embodiments, processor 216 and memory 218 (and/or other elements or components of eNB 210) may be arranged to perform the operations of hardware processing circuitry 800, such as operations described herein with reference to devices and circuitry within hardware processing circuitry 800. For example, one or more devices or circuits of hardware processing circuitry 800 may be implemented by combinations of software-configured elements and/or other hardware elements.

In some embodiments, hardware processing circuitry 800 may comprise one or more antenna ports 805 operable to provide various transmissions over a wireless communication channel (such as wireless communication channel 250). Antenna ports 805 may be coupled to one or more antennas 807 (which may be antennas 205). In some embodiments, hardware processing circuitry 800 may incorporate antennas 807, while in other embodiments, hardware processing circuitry 800 may merely be coupled to antennas 807.

Antenna ports 805 and antennas 807 may be operable to provide signals from an eNB to a wireless communications channel and/or a UE, and may be operable to provide signals from a UE and/or a wireless communications channel to an eNB. For example, antenna ports 805 and antennas 807 may be operable to provide transmissions from eNB 210 to wireless communication channel 250 (and from there to UE 230, or to another UE). Similarly, antennas 807 and antenna ports 805 may be operable to provide transmissions from a wireless communication channel 250 (and beyond that, from UE 230, or another UE) to eNB 210.

An apparatus of eNB 210 (or another eNB or base station) may be operable to communicate with a UE on a wireless network, and may comprise hardware processing circuitry 800. In some embodiments, the eNB (or other base station) may be a device comprising an application processor, a memory, one or more antenna ports, and an interface for allowing the application processor to communicate with another device.

With reference to FIG. 8, hardware processing circuitry 800 may comprise a first circuitry 810 and a second circuitry 820. First circuitry 810 may be operable to provide a maximum number of LAA CCs, a number of active LAA CCs, and a maximum power, which first circuitry 810 may provide to second circuitry 820 over an interface 815. Second circuitry 820 may be operable to determine a reference signal transmission power based upon the maximum number of LAA CCs and a maximum unlicensed-band power. The determined reference signal transmission power may be invariant with respect to the number of active LAA CCs.

In some embodiments, the reference signal transmission power may be a transmission power for a DRS transmission. In various embodiments, the number of active LAA CCs may include a PCell and one or more SCells. For some embodiments, the reference signal transmission power may be based upon a ratio of the maximum unlicensed-band power to the maximum number of LAA CCs.

In some embodiments, first circuitry 810 and second circuitry 820 may be implemented as separate circuitries. In other embodiments, one or more of first circuitry 810 and second circuitry 820 may be combined and implemented together in a circuitry without altering the essence of the embodiments. In various embodiments, processor 216 (and/ or one or more other processors which eNB 210 may comprise) may be arranged to perform the operations of first circuitry 810 and/or second circuitry 820. In such embodiments, first circuitry 810 and/or second circuitry 820 may accordingly be implemented by various combinations of software-configured elements (e.g., processor 216, and/or one or more other processors) and/or other hardware elements. In various embodiments, processor 216 (and/or one or more other processors which eNB 210 may comprise) may be a baseband processor.

Figure 9:
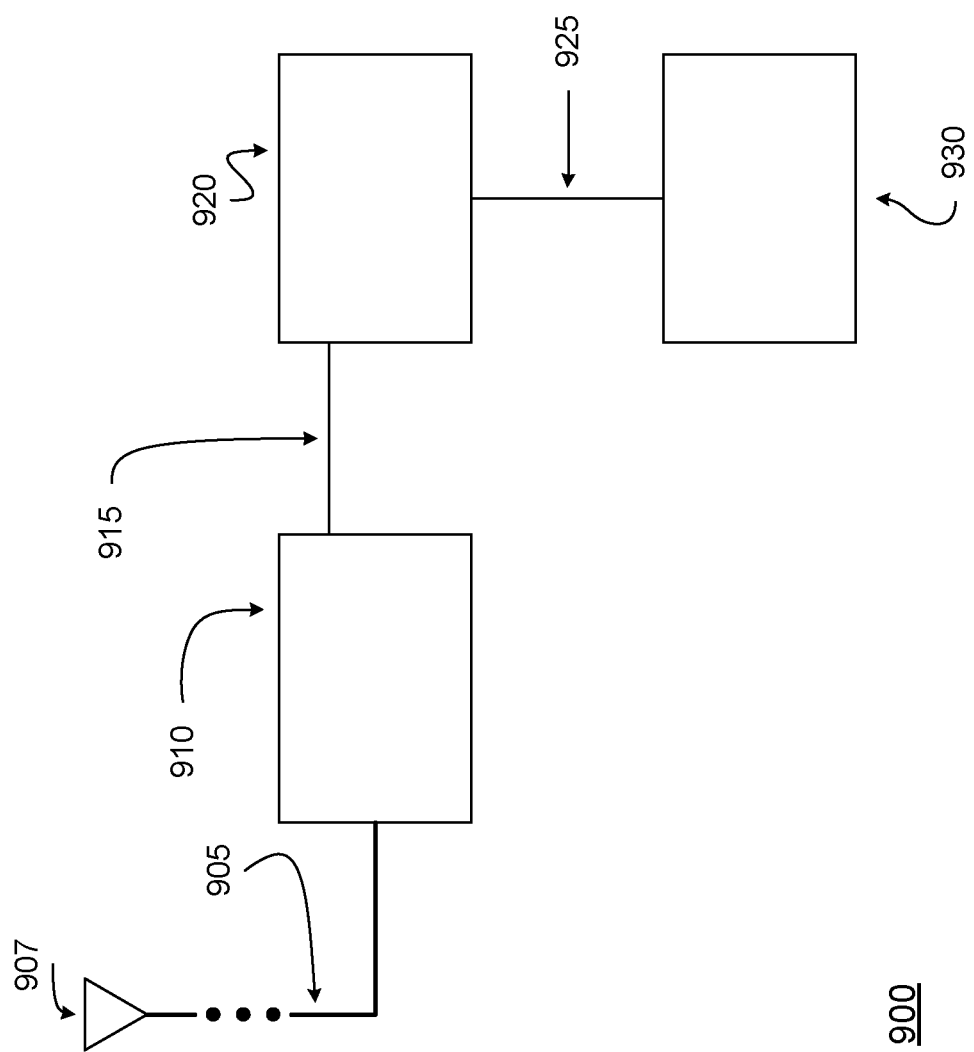
FIG. 9 illustrates hardware processing circuitries for a UE for supporting RRM measurement and reporting under LAA with dynamic power sharing, in accordance with some embodiments of the disclosure.

FIG. 9 illustrates hardware processing circuitries for a UE for supporting RRM measurement and reporting under LAA with dynamic power sharing, in accordance with some embodiments of the disclosure. A hardware processing circuitry 900 may comprise logic devices and/or circuitry operable to perform various operations. For example, with reference to FIGS. 2 and 9, UE 230 (or various elements or components therein, such as hardware processing circuitry 240, or combinations of elements or components therein) may include part of, or all of, hardware processing circuitry 900. In some embodiments, processor 236 and memory 238 (and/or other elements or components of UE 230) may be arranged to perform various operations of hardware processing circuitry 900, such as operations described herein with reference to devices and circuitry within hardware processing circuitry 900. For example, one or more devices or circuits of hardware processing circuitry 900 may be implemented by combinations of software-configured elements and/or other hardware elements.

In some embodiments, hardware processing circuitry 900 may comprise one or more antenna ports 905 operable to provide various transmissions over a wireless communication channel (such as wireless communication channel 250). Antenna ports 905 may be coupled to one or more antennas 907 (which may be antennas 205). In some embodiments, hardware processing circuitry 900 may incorporate antennas 907, while in other embodiments, hardware processing circuitry 900 may merely be coupled to antennas 907.

Antenna ports 905 and antennas 907 may be operable to provide signals from a UE to a wireless communications channel and/or an eNB, and may be operable to provide signals from an eNB and/or a wireless communications channel to a UE. For example, antenna ports 905 and antennas 907 may be operable to provide transmissions from UE 230 to wireless communication channel 250 (and from there to eNB 210, or to another eNB). Similarly, antennas 907 and antenna ports 905 may be operable to provide transmissions from a wireless communication channel 250 (and beyond that, from eNB 210, or another eNB) to UE 230.

An apparatus of UE 230 (or another UE or mobile handset) may be operable to communicate with an eNB on a wireless network, and may comprise hardware processing circuitry 900. In some embodiments, the UE (or other mobile handset) may be a device comprising an application processor, a memory, one or more antennas, a wireless interface for allowing the application processor to communicate with another device, and a touch-screen display.

With reference to FIG. 9, hardware processing circuitry 900 may comprise a first circuitry 910, a second circuitry 920, and a third circuitry 930. First circuitry 910 may be operable to receive a DRS transmission from eNB 210 (or another eNB), which may be provided to second circuitry 920 over an interface 915. Second circuitry 920 may be operable to determine a raw RRM measurement of the DRS transmission, which may be provided to third circuitry 930 over an interface 925. Third circuitry 930 may be operable to calculate a scaled RRM measurement based upon the raw RRM measurement.

In some embodiments, eNB 210 may include a PCell, and in some embodiments, eNB 210 may include an SCell. In various embodiments, eNB 210 may provide a transmission power in a control channel transmission. The control channel transmission may a PDCCH transmission, or an E-PDCCH transmission.

In some embodiments, third circuitry 930 may be operable to provide an unfiltered RRM measurement based on the raw RRM measurement. The raw RRM measurement may be provided to second circuitry 920 over interface 925, and from there it may be provided to first circuitry 910 over interface 915. First circuitry 910 may be operable to transmit an RRM report transmission including the unfiltered RRM measurement.

In some embodiments, first circuitry 910, second circuitry 920, and third circuitry 930 may be implemented as separate circuitries. In other embodiments, one or more of first circuitry 910, second circuitry 920, and third circuitry 930 may be combined and implemented together in a circuitry without altering the essence of the embodiments. In various embodiments, processor 236 (and/or one or more other processors which UE 230 may comprise) may be arranged to perform the operations of first circuitry 910, second circuitry 920, and/or third circuitry 930. In such embodiments, first circuitry 910, second circuitry 920, and/or third circuitry 930 may accordingly be implemented by various combinations of software-configured elements (e.g., processor 236, and/or one or more other processors) and/or other hardware elements. In various embodiments, processor 236 (and/or one or more other processors which UE 230 may comprise) may be a baseband processor.

FIG. 10 illustrates methods for an eNB for supporting RRM measurement and reporting under LAA with dynamic power sharing, in accordance with some embodiments of the disclosure. A method 1000 may comprise a providing 1010 and a determining 1020. In providing 1010, a maximum number of LAA CCs, a number of active LAA CCs, and a maximum power may be provided for eNB 210 (or another eNB). In determining 1020, a reference signal transmission power may be determined based upon the maximum number of LAA CCs and a maximum unlicensed-band power. The reference signal transmission power may be invariant with respect to the number of active LAA CCs.

In various embodiments, the reference signal transmission power may be a transmission power for a DRS transmission. In some embodiments, the number of active LAA CCs may include a PCell and one or more SCells. For various embodiments, the reference signal transmission power may be based upon a ratio of the maximum unlicensed-band power to the maximum number of LAA CCs.

F. Example UE Devices

Figure 11:
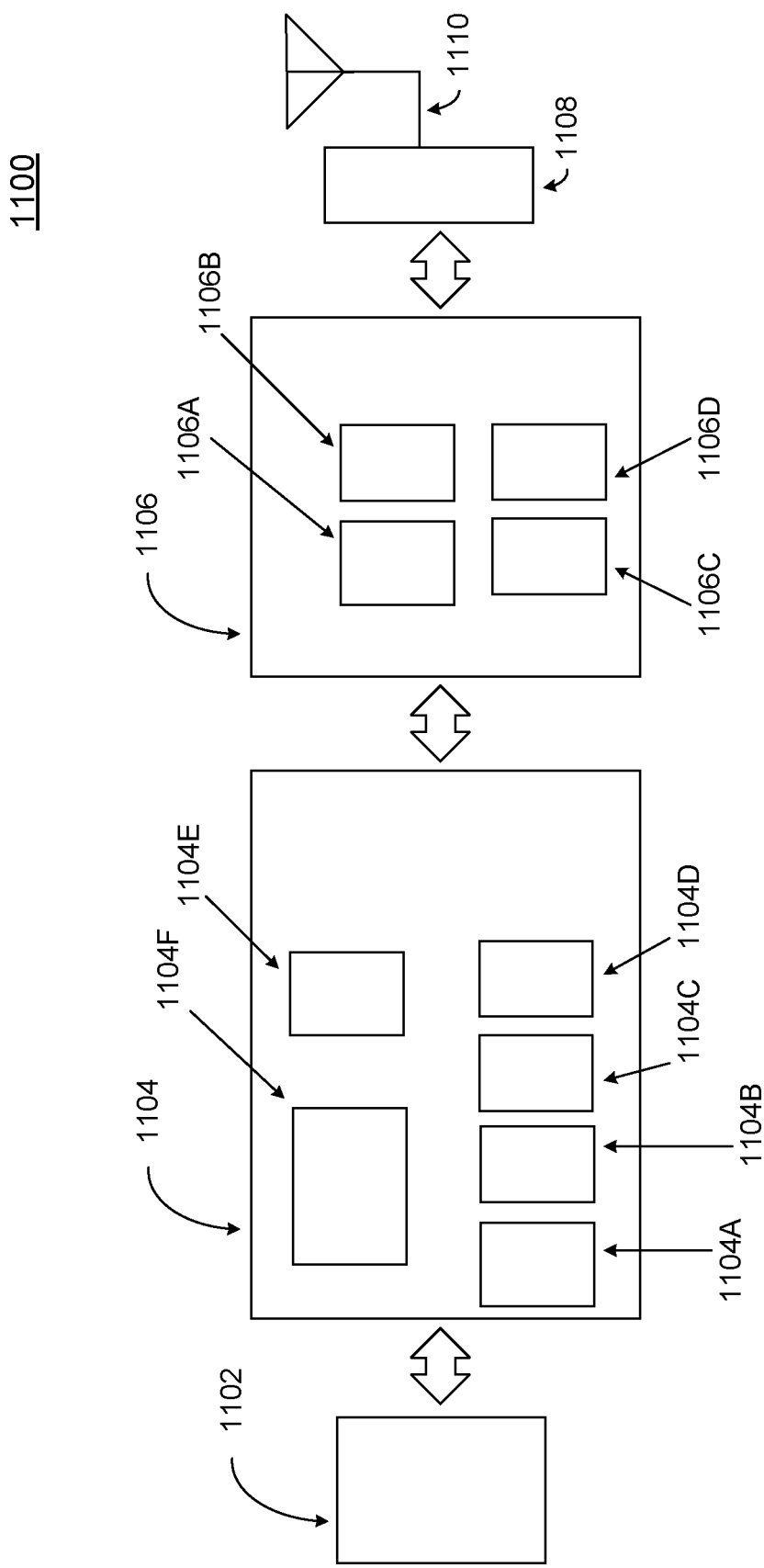
FIG. 11 illustrates example components of a UE device, in accordance with some embodiments of the disclosure.

FIG. 11 illustrates example components of a UE device 1100, in accordance with some embodiments of the disclosure. In some embodiments, the UE device 1100 may include application circuitry 1102, baseband circuitry 1104, Radio Frequency (RF) circuitry 1106, front-end module (FEM) circuitry 1108, a low-power wake-up receiver (LP-WUR), and one or more antennas 1110, coupled together at least as shown. In some embodiments, the UE device 1100 may include additional elements such as, for example, memory/storage, display, camera, sensor, and/or input/output (I/O) interface.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuity 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1104e of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104f. The audio DSP(s) 1104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b and filter circuitry 1106c. The transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the embodiments is not limited in this respect.

In some embodiments, the mixer circuitry 1106a of the receive signal path and the mixer circuitry 1106a of the transmit signal path may include two or more mixers and may be arranged for quadrature downconversion and/or upconversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and/or direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE 1100 comprises a plurality of power saving mechanisms. If the UE 1100 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. Since the device might not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment any- where the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of an Evolved Node-B (eNB) operable to communicate with a User Equipment (UE) on a wireless network subject to License Assisted Access (LAA), comprising: one or more processors to: generate a maximum number of component carriers (CCs) for a bandwidth and a number of active CCs for the bandwidth; generate a reference signal for the UE; process a reported quality rating from the UE; and generate a scaled quality rating based upon the reported quality rating, the maximum number of CCs for the bandwidth, and the number of active CCs for the bandwidth.

In example 2, the apparatus of example 1, wherein the maximum number of CCs for the bandwidth may include a Primary Cell (PCell) and one or more Secondary Cells (SCells).

In example 3, the apparatus of either of examples 1 or 2, wherein the scaled quality rating is determined based upon the reported quality rating divided by a ratio of the number of active CCs for the bandwidth to the maximum number of CCs for the bandwidth.

In example 4, the apparatus of any of examples 1 through 3, wherein the reported quality rating is part of a Channel Quality Indication (CQI) transmission based on the reference signal generated by the eNB.

In example 5, the apparatus of example 4, wherein the reference transmission is one of: a Cell-specific Reference Signal (CRS) transmission, or a Channel State Information Reference Signal (CSI-RS) transmission.

In example 6, the apparatus of either of examples 4 or 5, wherein the number of active CCs for the bandwidth is determined at one of: a predetermined time before the transmission of the reference signal, a time within a predetermined window of time before the transmission of the reference signal, or substantially the same time as the transmission of the reference signal.

In example 7. An eNB device comprising an application processor, a memory, one or more antenna ports, and an interface for allowing the application processor to communicate with another device, the eNB device including the apparatus of any of examples 1 through 6.

Example 8 provides machine readable storage media having machine executable instructions that, when executed, cause one or more processors to perform an operation comprising: generate, for an Evolved Node-B (eNB), a maximum number of Component Carriers (CCs) for a bandwidth and a number of active CCs for the bandwidth; generate a reference signal for a User Equipment (UE); process a reported quality rating from the UE; and generate a scaled quality rating based upon the reported quality rating, the maximum number of CCs for the bandwidth, and the number of active CCs for the bandwidth.

In example 9, the machine readable storage media of example 8, wherein the maximum number of CCs for the bandwidth may include a Primary Cell (PCell) and one or more Secondary Cells (SCells).

In example 10, the machine readable storage media of either of examples 8 or 9, wherein the scaled quality rating is determined based upon the reported quality rating divided by a ratio of the number of active CCs for the bandwidth to the maximum number of CCs for the bandwidth.

In example 11, the machine readable storage media of any of examples 8 through 10, wherein the reported quality rating is processed as part of a Channel Quality Indication (CQI) transmission based on the reference signal generated by the eNB.

In example 12, the machine readable storage media of example 11, wherein the reference transmission is one of: a Cell-specific Reference Signal (CRS) transmission, or a Channel State Information Reference Signal (CSI-RS) transmission.

In example 13, the machine readable storage media of either of examples 11 or 12, wherein the number of active CCs for the bandwidth is determined at one of: a predetermined time before the transmission of the reference signal, a time within a predetermined window of time before the transmission of the reference signal, or substantially the same as the transmission of the reference signal.

Example 14 provides a method comprising: generating, for an Evolved Node-B (eNB), a maximum number of Component Carriers (CCs) for a bandwidth and a number of active CCs for the bandwidth; generating a reference signal for a User Equipment (UE); processing a reported quality rating from the UE; and generating a scaled quality rating based upon the reported quality rating, the maximum number of CCs for the bandwidth, and the number of active CCs for the bandwidth.

In example 15, the method of example 14, wherein the maximum number of CCs for the bandwidth may include a Primary Cell (PCell) and one or more Secondary Cells (SCells).

In example 16, the method of either of examples 14 or 15, wherein the scaled quality rating is determined based upon the reported quality rating divided by a ratio of the number of active CCs for the bandwidth to the maximum number of CCs for the bandwidth.

In example 17, the method of any of examples 14 through 16, wherein the reported quality rating is processed as part of a Channel Quality Indication (CQI) transmission based on the reference signal generated by the eNB.

In example 18, the method of example 17, wherein the reference transmission is one of: a Cell-specific Reference Signal (CRS) transmission, or a Channel State Information Reference Signal (CSI-RS) transmission.

In example 19, the method of either of examples 17 or 18, wherein the number of active CCs for the bandwidth is determined at one of: a predetermined time before the transmission of the reference signal, a time within a predetermined window of time before the transmission of the reference signal, or substantially the same as the transmission of the reference signal.

Example 20 provides machine readable storage media having machine executable instructions stored thereon that, when executed, cause one or more processors to perform a method according to any one of examples 14 through 19.

Example 21 provides an apparatus of an Evolved Node-B (eNB) operable to communicate with a User Equipment (UE) on a wireless network subject to License Assisted Access (LAA), comprising: means for generating a maximum number of Component Carriers (CCs) for a bandwidth and a number of active CCs for the bandwidth; means for generating a reference signal for a User Equipment (UE); means for processing a reported quality rating from the UE; and means for generating a scaled quality rating based upon the reported quality rating, the maximum number of CCs for the bandwidth, and the number of active CCs for the bandwidth.

In example 22, the apparatus of example 21, wherein the maximum number of CCs for the bandwidth may include a Primary Cell (PCell) and one or more Secondary Cells (SCells).

In example 23, the apparatus of either of examples 21 or 22, wherein the scaled quality rating is determined based upon the reported quality rating divided by a ratio of the number of active CCs for the bandwidth to the maximum number of CCs for the bandwidth.

In example 24, the apparatus of any of examples 21 through 23, wherein the reported quality rating is processed as part of a Channel Quality Indication (CQI) transmission based on the reference signal generated by the eNB.

In example 25, the apparatus of example 24, wherein the reference transmission is one of: a Cell-specific Reference Signal (CRS) transmission, or a Channel State Information Reference Signal (CSI-RS) transmission.

In example 26, the apparatus of either of examples 24 or 25, wherein the number of active CCs for the bandwidth is determined at one of: a predetermined time before the transmission of the reference signal, a time within a predetermined window of time before the transmission of the reference signal, or substantially the same as the transmission of the reference signal.

Example 27 provides an apparatus of a User Equipment (UE) operable to communicate with an Evolved Node B (eNB) on a wireless network subject to License Assisted Access (LAA), comprising: one or more processors to: process a reference signal transmission from the eNB; generate an unfiltered reference signal transmission based on the reference signal transmission; and calculate a quality rating based upon the unfiltered reference signal transmission.

In example 28, the apparatus of example 27, wherein the quality reporting is included in a Channel Quality Indication (CQI) transmission.

In example 29, the apparatus of either of examples 27 or 28, wherein the reference signal transmission is one of: a Cell-specific Reference Signal (CRS) transmission, or a Channel State Information Reference Signal (CSI-RS) transmission.

In example 30. A UE device comprising an application processor, a memory, one or more antennas, a wireless interface for allowing the application processor to communicate with another device, and a touch-screen display, the UE device including the apparatus of any of examples 27 through 29.

Example 31 provides machine readable storage media having machine executable instructions that, when executed, cause one or more processors to perform an operation comprising: process, for a User Equipment (UE), a reference signal transmission from an Evolved Node-B (eNB); generate an unfiltered reference signal transmission based on the reference signal transmission; and calculate a quality rating based upon the unfiltered reference signal transmission.

In example 32, the machine readable storage media of example 31, wherein the quality reporting is included in a Channel Quality Indication (CQI) transmission.

In example 33, the machine readable storage media of either of examples 31 or 32, wherein the reference signal transmission is one of: a Cell-specific Reference Signal (CRS) transmission, or a Channel State Information Reference Signal (CSI-RS) transmission.

Example 34 provides a method comprising: processing, for a User Equipment (UE), a reference signal transmission from an Evolved Node-B (eNB); generating an unfiltered reference signal transmission based on the reference signal transmission; and calculating a quality rating based upon the unfiltered reference signal transmission.

In example 35, the method of example 34, wherein the quality reporting is included in a Channel Quality Indication (CQI) transmission.

In example 36, the method of either of examples 34 or 35, wherein the reference signal transmission is one of: a Cell-specific Reference Signal (CRS) transmission, or a Channel State Information Reference Signal (CSI-RS) transmission.

Example 37 provides machine readable storage media having machine executable instructions stored thereon that, when executed, cause one or more processors to perform a method according to any one of examples 34 through 36.

Example 38 provides an apparatus of a User Equipment (UE) operable to communicate with an Evolved Node B (eNB) on a wireless network subject to License Assisted Access (LAA), comprising: means for processing a reference signal transmission from an Evolved Node-B (eNB); means for generating an unfiltered reference signal transmission based on the reference signal transmission; and means for calculating a quality rating based upon the unfiltered reference signal transmission.

In example 39, the apparatus of example 38, wherein the quality reporting is included in a Channel Quality Indication (CQI) transmission.

In example 40, the apparatus of either of examples 38 or 39, wherein the reference signal transmission is one of: a Cell-specific Reference Signal (CRS) transmission, or a Channel State Information Reference Signal (CSI-RS) transmission.

Example 41 provides an apparatus of a User Equipment (UE) operable to communicate with an Evolved Node B (eNB) on a wireless network subject to License Assisted Access (LAA), comprising: one or more processors to: process a Downlink Control Information (DCI) transmission from the eNB; process a reference signal transmission from the eNB; determine a raw quality rating based upon a measurement of the reference signal transmission; and calculate a scaled quality rating based upon the raw quality rating and scaling information included in the DCI.

In example 42, the apparatus of example 41, wherein the eNB includes a Primary Cell (PCell).

In example 43, the apparatus of example 41, wherein the eNB includes a Secondary Cell (SCell).

In example 44, the apparatus of any of examples 41 through 43, wherein the DCI transmission indicates a number of CCs used for one of: a previous sub-frame, or an ongoing burst generated by the eNB on an unlicensed CC.

In example 45, the apparatus of any of examples 41 through 44, wherein the DCI transmission indicates one of: a transmission power for a CC, or an average transmission power over a number of CCs.

In example 46, the apparatus of any of examples 41 through 45, wherein the DCI transmission includes at least one of: a scaling factor, a list of active SCells, a list of SCells used for data burst transmission, or a transmission power for one or more CCs.

In example 47, the apparatus of any of examples 41 through 46, wherein the one or more processors are further to determine, based upon presence of Physical Downlink Control Channel (PDCCH) transmissions on one or more CCs, a number of SCells used for one of: a subframe, or a data burst on an unlicensed band.

In example 48. A UE device comprising an application processor, a memory, one or more antennas, a wireless interface for allowing the application processor to communicate with another device, and a touch-screen display, the UE device including the apparatus of any of examples 41 through 47.

Example 49 provides an apparatus of an Evolved Node-B (eNB) operable to communicate with a User Equipment (UEs) on a wireless network subject to License Assisted Access (LAA), comprising: one or more processors to: generate a maximum number of LAA component carriers (CCs), a number of active LAA CCs, and a maximum power; and determine a reference signal transmission power based upon the maximum number of LAA CCs and a maximum unlicensed-band power, the reference signal transmission power being invariant with respect to the number of active LAA CCs.

In example 50, the apparatus of example 49, wherein the reference signal transmission power is a transmission power for a Dedicated Reference Signal (DRS) transmission.

In example 51, the apparatus of either of examples 49 or 50, wherein the number of active LAA CCs may include a Primary Cell (PCell) and one or more Secondary Cells (SCells).

In example 52, the apparatus of any of examples 49 through 51, wherein the reference signal transmission power is based upon a ratio of the maximum unlicensed-band power to the maximum number of LAA CCs.

In example 53. An eNB device comprising an application processor, a memory, one or more antenna ports, and an interface for allowing the application processor to communicate with another device, the eNB device including the apparatus of any of examples 49 through 52.

Example 54 provides machine readable storage media having machine executable instructions that, when executed, cause one or more processors to perform an operation comprising: generate, for an Evolved Node-B (eNB), a maximum number of LAA component carriers (CCs), a number of active LAA CCs, and a maximum power; and determine a reference signal transmission power based upon the maximum number of LAA CCs and a maximum unlicensed-band power, the reference signal transmission power being invariant with respect to the number of active LAA CCs.

In example 55, the machine readable storage media of example 54, wherein the reference signal transmission power is a transmission power for a Dedicated Reference Signal (DRS) transmission.

In example 56, the machine readable storage media of either of examples 54 or 55, wherein the number of active LAA CCs may include a Primary Cell (PCell) and one or more Secondary Cells (SCells).

In example 57, the machine readable storage media of any of examples 54 through 56, wherein the reference signal transmission power is based upon a ratio of the maximum unlicensed-band power to the maximum number of LAA CCs.

Example 58 provides a method comprising: generating, for an Evolved Node-B (eNB), a maximum number of LAA component carriers (CCs), a number of active LAA CCs, and a maximum power; and determining a reference signal transmission power based upon the maximum number of LAA CCs and a maximum unlicensed-band power, the reference signal transmission power being invariant with respect to the number of active LAA CCs.

In example 59, the method of example 58, wherein the reference signal transmission power is a transmission power for a Dedicated Reference Signal (DRS) transmission.

In example 60, the method of either of examples 58 or 59, wherein the number of active LAA CCs may include a Primary Cell (PCell) and one or more Secondary Cells (SCells).

In example 61, the method of any of examples 58 through 60, wherein the reference signal transmission power is based upon a ratio of the maximum unlicensed-band power to the maximum number of LAA CCs.

Example 62 provides machine readable storage media having machine executable instructions stored thereon that, when executed, cause one or more processors to perform a method according to any one of examples 58 through 61.

Example 63 provides an apparatus of an Evolved Node-B (eNB) operable to communicate with a User Equipment (UEs) on a wireless network subject to License Assisted Access (LAA), comprising: means for generating a maximum number of LAA component carriers (CCs), a number of active LAA CCs, and a maximum power; and means for determining a reference signal transmission power based upon the maximum number of LAA CCs and a maximum unlicensed-band power, the reference signal transmission power being invariant with respect to the number of active LAA CCs.

In example 64, the apparatus of example 63, wherein the reference signal transmission power is a transmission power for a Dedicated Reference Signal (DRS) transmission.

In example 65, the apparatus of either of examples 63 or 64, wherein the number of active LAA CCs may include a Primary Cell (PCell) and one or more Secondary Cells (SCells).

In example 66, the apparatus of any of examples 63 through 65, wherein the reference signal transmission power is based upon a ratio of the maximum unlicensed-band power to the maximum number of LAA CCs.

Example 67 provides an apparatus of a User Equipment (UE) operable to communicate with an Evolved Node B (eNB) on a wireless network subject to License Assisted Access (LAA), comprising: one or more processors to: process a Demodulation Reference Signal (DRS) transmission from the eNB; determine a raw Radio Resource Management (RRM) measurement of the DRS transmission; and calculate a scaled RRM measurement based upon the raw RRM measurement.

In example 68, the apparatus of example 67, wherein the eNB includes a Primary Cell (PCell).

In example 69, the apparatus of example 67, wherein the eNB includes a Secondary Cell (SCell).

In example 70, the apparatus of any of examples 67 through 69, wherein the eNB may generate a transmission power in a control channel transmission.

In example 71, the apparatus of example 70, wherein the control channel transmission is one of: a Physical Downlink Shared Channel (PDCCH) transmission, or an Enhanced PDCCH (E-PDCCH) transmission.

In example 72, the apparatus of any of examples 67 through 42, wherein the one or more processors are further to generate an unfiltered RRM measurement based on the raw RRM measurement.

In example 73, the apparatus of example 72, wherein the one or more processors are further to generate an RRM report transmission including the unfiltered RRM measurement.

In example 74. A UE device comprising an application processor, a memory, one or more antennas, a wireless interface for allowing the application processor to communicate with another device, and a touch-screen display, the UE device including the apparatus of any of examples 67 through 73.

In example 75, the apparatus of any of examples 1 through 7, 21 through 26, 27 through 30, 38 through 40, 41 through 48, 49 through 53, 63 through 66, and 67 through 74, wherein the one or more processors comprise a baseband processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of a base station operable to communicate with a User Equipment (UE) on a wireless network subject to License Assisted Access (LAA), comprising:
    one or more processors to:
        generate a maximum number of component carriers (CCs) for a bandwidth and a number of active CCs for the bandwidth;
        generate a reference signal for the UE;
        process a reported quality rating from the UE; and
        generate a scaled quality rating based upon the reported quality rating, the maximum number of CCs for the bandwidth, and the number of active CCs for the bandwidth.

2. The apparatus of claim 1, wherein the maximum number of CCs for the bandwidth may include a Primary Cell (PCell) and one or more Secondary Cells (SCells).

3. The apparatus of claim 1, wherein the scaled quality rating is determined based upon the reported quality rating divided by a ratio of the number of active CCs for the bandwidth to the maximum number of CCs for the bandwidth.

4. The apparatus of claim 1, wherein the reported quality rating is part of a Channel Quality Indication (CQI) transmission based on the reference signal.

5. The apparatus of claim 4, wherein transmission of the reference signal is one of: a Cell-specific Reference Signal (CRS) transmission, or a Channel State Information Reference Signal (CSI-RS) transmission.

6. The apparatus of claim 4, wherein the number of active CCs for the bandwidth is determined at one of: a predetermined time before transmission of the reference signal, a time within a predetermined window of time before the transmission of the reference signal, or substantially the same time as the transmission of the reference signal.

7. Non-transitory machine readable storage media having machine executable instructions that, when executed, cause one or more processors to perform operations comprising:
generating, for a base station, a maximum number of Component Carriers (CCs) for a bandwidth and a number of active CCs for the bandwidth;
generating a reference signal for a User Equipment (UE);
processing a reported quality rating from the UE; and
generating a scaled quality rating based upon the reported quality rating, the maximum number of CCs for the bandwidth, and the number of active CCs for the bandwidth.

8. The non-transitory machine readable storage media of claim 7, wherein the maximum number of CCs for the bandwidth may include a Primary Cell (PCell) and one or more Secondary Cells (SCells).

9. The non-transitory machine readable storage media of claim 7, wherein the scaled quality rating is determined based upon the reported quality rating divided by a ratio of the number of active CCs for the bandwidth to the maximum number of CCs for the bandwidth.

10. The non-transitory machine readable storage media of claim 7, wherein the reported quality rating is processed as part of a Channel Quality Indication (CQI) transmission based on the reference signal.

11. The non-transitory machine readable storage media of claim 10, wherein transmission of the reference signal is one of: a Cell-specific Reference Signal (CRS) transmission, or a Channel State Information Reference Signal (CSI-RS) transmission.

12. The non-transitory machine readable storage media of claim 10, wherein the number of active CCs for the bandwidth is determined at one of: a predetermined time before transmission of the reference signal, a time within a predetermined window of time before the transmission of the reference signal, or substantially the same time as the transmission of the reference signal.

13. An apparatus of a User Equipment (UE) operable to communicate with a base station on a wireless network subject to License Assisted Access (LAA), comprising:
one or more processors to:
process a reference signal transmission from the base station;
generate an unfiltered reference signal transmission based on the reference signal transmission; and
calculate a quality rating based upon the unfiltered reference signal transmission.

14. The apparatus of claim 13, wherein the quality rating is included in a Channel Quality Indication (CQI) transmission.

15. The apparatus of claim 13, wherein the reference signal transmission is one of: a Cell-specific Reference Signal (CRS) transmission, or a Channel State Information Reference Signal (CSI-RS) transmission.

16. Non-transitory machine readable storage media having machine executable instructions that, when executed, cause one or more processors to perform operations comprising:
processing, for a User Equipment (UE), a reference signal transmission from a base station;
generating an unfiltered reference signal transmission based on the reference signal transmission; and
calculating a quality rating based upon the unfiltered reference signal transmission.

17. The non-transitory machine readable storage media of claim 16, wherein the quality rating is included in a Channel Quality Indication (CQI) transmission.

18. The non-transitory machine readable storage media of claim 16, wherein the reference signal transmission is one of: a Cell-specific Reference Signal (CRS) transmission, or a Channel State Information Reference Signal (CSI-RS) transmission.

* * * * *